United States Patent [19]

Levasseur

[11] Patent Number: 4,777,138

[45] Date of Patent: Oct. 11, 1988

[54] SCOOP WHEEL FERMENTATION UNIT

[75] Inventor: Jean-Pierre Levasseur, St. Germain En Lay, France

[73] Assignee: O T V (Omnium de Traitements et de Valorisation, Courbevoie, Cedex, France

[21] Appl. No.: 77,213

[22] Filed: Jul. 24, 1987

[51] Int. Cl.⁴ ............................................. C12C 1/00
[52] U.S. Cl. .................... 435/306; 435/316; 34/181; 366/313; 366/309; 422/225
[58] Field of Search ............. 435/306, 287, 819, 316; 34/179-183, 166; 99/275, 276, 277, 277.1; 422/225, 233; 366/309, 312, 313, 271

[56] References Cited

U.S. PATENT DOCUMENTS

| | | | |
|---|---|---|---|
| 518,665 | 4/1894 | Dornfeld | 435/306 |
| 748,875 | 1/1904 | Mueller | 435/306 |
| 942,649 | 12/1909 | Kondolf | 435/306 |
| 3,438,740 | 4/1969 | Brown | 366/271 |
| 4,495,290 | 1/1985 | Ito et al. | 435/316 |

FOREIGN PATENT DOCUMENTS

| | | | |
|---|---|---|---|
| 641849 | 12/1963 | Belgium . | |
| 1530586 | 7/1968 | France | 435/306 |

Primary Examiner—James C. Yeung
Attorney, Agent, or Firm—Browdy and Neimark

[57] ABSTRACT

A fermentation unit comprising a scoop wheel equipped with scoops on the periphery thereof, and which moves between bunker silos. The bunker silos are equipped with aeration ducts at the base thereof. Flexible scrapers located around the periphery of the scoop wheel scrape the aeration ducts. Unstacking barbs are also located on the periphery of the scoop wheel. Means are provided to adapt the unit to the type of materials to be treated.

10 Claims, 1 Drawing Sheet

SCOOP WHEEL FERMENTATION UNIT

FIELD OF THE INVENTION

This invention relates to a fermentation unit comprising a scoop wheel which is intended to turn piles of garbage to transform them into compost and to evacuate them laterally.

BACKGROUND OF THE INVENTION

A scoop wheel fermentation unit is described in French patent No. 1.530.586 of the present applicant. This unit essentially comprises a wheel that is driven in rotation around a horizontal axis, which can move along bunker silos and from one bunker silo to the next and is equipped on its periphery with scoops attacking the pile of compost to put the compost in contact with the air and to place the compost on a holding machine, the holding machine pouring the compost into the neighboring bunker silo.

SUMMARY OF THE INVENTION

The object of the present invention is to increase the efficiency of the known type fermentation unit, while retaining its simplicity and toughness and, in particular, to enable it to treat garbage which comprises both fibrous or soft and resistant materials, the moisture content of these materials being able to go from 40%, as is often the case in France, up to 80%, as can be encountered in tropical countries during the rainy season.

According to the invention, this object, as well as others which will come out below, are attained by use of a scoop wheel fermentation unit of the type specified above which is characterized in that the bunker silos are equipped at their base with aeration ducts fed by a booster. The periphery of the scoop wheel is equipped with flexible scrapers placed to be able to scrape these aeration ducts. The scoop wheel is also equipped on its periphery with radially directed lateral unstacking barbs. The fermentation unit according to the present invention comprises means enabling it to adapt to the type of materials to be treated. The main parameters that determine the types of materials are its grain size, and therefore its density and its viscosity.

Advantageously, the means making it possible to adapt the fermentation unit to the type of materials to be treated comprise means to make easily interchangeable the scoops that are mounted on the periphery of the scoop wheel and/or means to tilt these scoops in relation to the corresponding radius of the wheel by an angle which, preferably, is between 5° and 20°.

For the treatment of certain types of materials, which will be specified below, the scoops in question are equipped with teeth on their leading edge. The fermentation unit comprises a cleaning device which is generally a rotary brush which is mounted above the scoop wheel to come in contact with the latter on its periphery and, thus, to free its scoops from materials that could adhere thereto.

In certain cases, the fermentation unit according to the invention can advantageously further comprise a blower on the inside of the scoop wheel to increase aeration of the materials, and it is also possible to equip this unit with a water injection pipe placed in the high part of the wheel to moisten the materials during their drop into the evacuation device.

According to an advantageous embodiment, the scoop wheel of the fermentation unit according to the invention moves along bunker silos and from one bunker silo to the next on metal beams or is suspended from a traveling crane, which, in some cases, makes the installation less costly.

BRIEF DESCRIPTION OF THE DRAWINGS

The following description, which has no limiting character, will give a better understanding of how this invention can be put into practice. It should be read in connection with the accompanying drawings, of which.

DETAILED DESCRIPTION OF THE INVENTION

Figure 1:
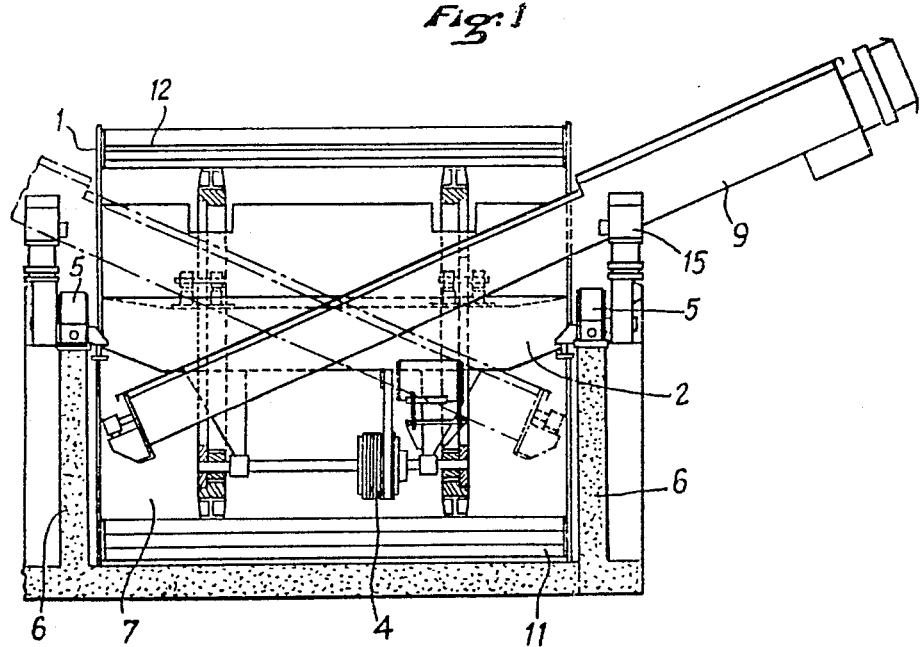
FIG. 1 represents a front view of the fermentation unit according to the invention.
Figure 2:
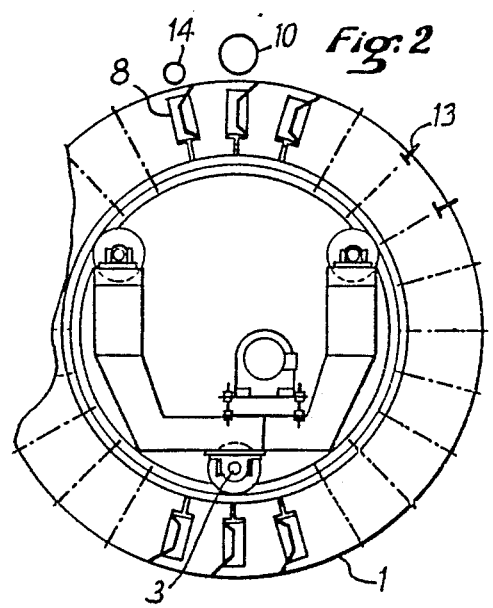
FIG. 2 shows a view in section of this unit along line II—II of FIG. 1.

As described in the French patent cited above, and as shown in FIGS. 1 and 2, this fermentation unit comprises a scoop wheel 1 which can turn around a horizontal axis 2 by means of rollers 3 and which is driven by a motor 4. This wheel 1 can also travel on rollers 5 along low walls 6 which between them define a bunker silo 7/receiving the materials to be treated. The periphery of the wheel comprises scoops or bucket blades 8 which turn the compost and place it on a lateral endless evacuation conveyor 9 which, to finish, discharges the compost in a neighboring bunker silo.

Figure 3:
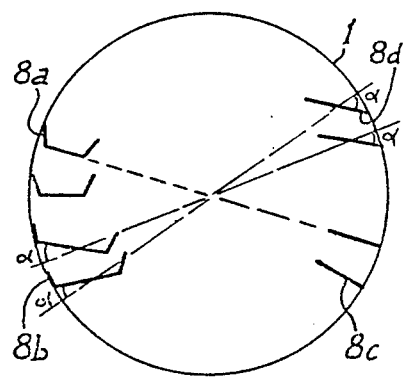
FIG. 3 represents very diagrammatically of various types of scoops mounted on the scoop wheel of the fermentation unit according to the invention.

According to the invention, and as shown in FIG. 3, the scoops or buckets 8 of scoop wheel 1 differ according to the material to be treated, the main parameters which determine their choice being the grain size of these materials, and therefore their density, as well as their viscosity. Further, scoops 8 are made easily interchangeable by way of means not represented which are within the scope of one skilled in the art.

Thus, in the case, for example, of garbage ground and then screened at a particle size on the order of 50 to 70 mm, large-capacity bucket blades 8a will be used. Further, if this garbage is relatively sticky, for example, because it is mixed with dehydrated muds, these scoops, 8b, are advantageously tilted by an angle alpha between 5° and 20° in relation to the axis of scoop wheel 1, to facilitate the drop of the product into evacuation device 9.

For other much more dense products such as slaughterhouse wastes and muds mixed with sawdust, preferably straight scoops 8c will be used which, as above, can be tilted by an angle alpha between 5° and 20° in relation to the axis of the wheel, like the scoops represented diagrammatically at 8d in FIG. 3.

Further, scoops 8 can be equipped with teeth (not shown) on their leading edge to facilitate picking up of the materials at the bottom of the pile.

Finally, for treatment of very viscous materials such as a mixture of wood strips and dehydrated muds, a cleaning device, which is preferably a rotary brush 10, is mounted at the high part of scoop wheel 1 so assure dropping of all the product into evacuation device 9.

Also according to the invention, bunker silos 7 are equipped at their base with aeration ducts 11 fed by a booster (not shown), and the periphery of scoop wheel 1 is equipped with flexible scrapers 12, of rubber for example, which are placed to be able to scrape aeration ducts 11. This aeration makes it possible to reduce considerably the period and surface necessary for the fermentation. However, certain products with a very high content of fermentable organic products, such as agro-food wastes and fresh muds coming from purification stations, require a much greater level of aeration. In this case, an additional aeration can be performed by means of a blower (not shown) which is located on the inside of scoop wheel 1, above evacuation device 9, and which is directed toward the dropping of the materials from scoops 8.

Scoop wheel 1 also comprises on its periphery lateral unstacking barbs 13 which are directed radially toward the outside of wheel 1.

On the other hand, it happens that during intense, long-period fermentation, or during injection of too hot air because of outside conditions, the materials to be treated are dehydrated too much. In this case, it is necessary to provide, according to the invention, a water injection device which is located at the high part of wheel 1 and which moistens the materials during their drop into evacuation device 9. This injection is achieved with a metal pipe 14 equipped with nozzles (FIG. 1). This pipe 14 is made solid with transfer carriage 15 of wheel 1 by means of a support, and it is fed with water, from carriage 15, by a hose mounted on a winding device.

Finally, as described above, low walls 6 which delimit bunker silos 7 and are general made of concrete, can be replaced by metal structures of beams, which may be less costly. Also, wheel 1 could be suspended from a traveling crane, which makes it possible to eliminate silos 7 completely. Further, in case concrete low walls 6 are kept, it is possible to give them a height much less than that usually used, provided that wider compost piles are formed at the base.

What is claimed is:

1. In a scoop wheel fermentation unit comprising a wheel which is driven in rotation around a horizontal axis, which can move along bunker silos and from one silo to the next, said wheel being equipped on its periphery with scoops attacking the pile of compost to put the compost into contact with air and comprising means for transferring the compost to a laterally extending conveyor pouring the compost into the neighboring bunker silo, the improvement comprising at least one aeration duct extending along the base of said silos and connected to air feeding means; flexible scrapers mounted on the periphery of said scoop wheel so as to scrape said aeration duct; lateral unstacking barbs on the periphery of said scoop wheel, said barbs being directed radially toward the outside; and means for adapting said fermentation unit to the type of materials to be treated.

2. The fermentation unit of claim 1 wherein said means to adapt said unit comprise means to make said scoops readily interchangeable.

3. The fermentation unit of claim 1 wherein said means to adapt said unit comprises means to tilt said scoops by an angle in relation to the corresponding radius of said scoop wheel.

4. The fermentation unit of claim 3 wherein said angle is from 5° to 20°.

5. The fermentation unit of claim 1 wherein said scoops include teeth on the leading edges thereof.

6. The fermentation unit of claim 1 further including a cleaning device which is mounted above said scoop wheel to contact the scoop wheel on the periphery thereof.

7. The fermentation unit of claim 1 further including a blower on the inside of said scoop wheel.

8. The fermentation unit of claim 1 further including a water injection pipe placed above said scoop wheel.

9. The fermentation unit of claim 1 further including metal beams on which said scoop wheel travels.

10. The fermentation wheel of claim 1 further including a traveling crane to move said scoop wheel.

* * * * *